United States Patent

Pitt

[15] 3,676,502
[45] July 11, 1972

[54] BENZ⟨a⟩ANTHRACENE STEROID ANALOGUE

[72] Inventor: Colin G. Pitt, Durham, N.C.
[73] Assignee: Eli Lilly and Company, Indianapolis, Ind.
[22] Filed: Oct. 5, 1970
[21] Appl. No.: 78,149

[52] U.S. Cl. .....................260/613 R, 260/343.5, 260/590, 260/999, 424/341
[51] Int. Cl. ........................................C07c 43/20
[58] Field of Search ................................260/613 R

[56] References Cited

OTHER PUBLICATIONS

Christol et al., Chem. Abs., Vol. 56 (1962) pp. 5893–5895

*Primary Examiner*—Bernard Helfin
*Attorney*—Everet F. Smith and James L. Rowe

[57] ABSTRACT

A benz ⟨a⟩ anthracene of the formula:

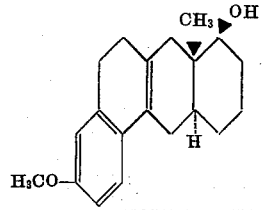

synthesized from 5β-hydroxy-10β-methyl-trans-2-decalone.

1 Claim, No Drawings

BENZ ANTHRACENE STEROID ANALOGUE

This invention relates to the synthesis of a novel steroid analogue, and more particularly to a novel decahydro-8-hydroxy-3-methoxy-7-methylbenz <a> anthracene.

It is an object of the present invention to produce a novel synthetic steroid analogue 5, 6, 7, 7aβ, 8, 9, 10, 11, 11aα, 12-decahydro-8β-hydroxy-3-methoxy-7a-methylbenz <a> anthracene having the formula:

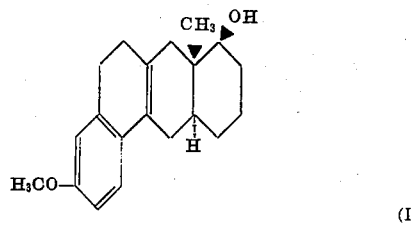

(I)

It has been found in accordance with the practice of this invention that the novel compound of this invention can be synthesized from 5β-hydroxy-10β-methyl-trans-2-decalone

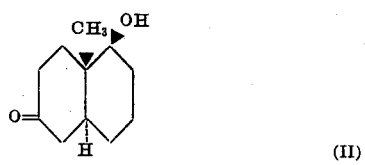

(II)

using as the key procedure a modified Stork enamine alkylation procedure (Stork et al. *J.A.C.S.*, 85, 207(1963)). The synthesis in the novel compound of the invention is outlined below.

The 5β-hydroxy-10β-methyl-trans-2-decalone (II), prepared in accordance with the procedure described by Boyce and Whitehurst (*J. Chem. Soc.*, 2680, (1960)), is first reacted with dihydropyran to form the corresponding pyranyl ether (III).

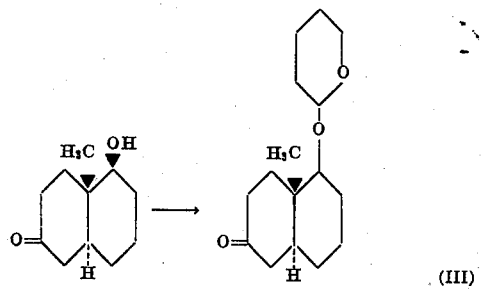

(III)

which is, in turn, reacted with cyclohexylamine to form the corresponding enamine (IV)

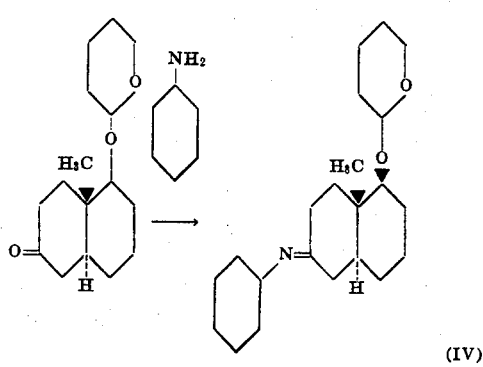

(IV)

The enamine (IV) is thereafter reacted with ethyl magnesium bromide in tetrahydrofuran and m-methoxyphenethyl bromide as illustrated below:

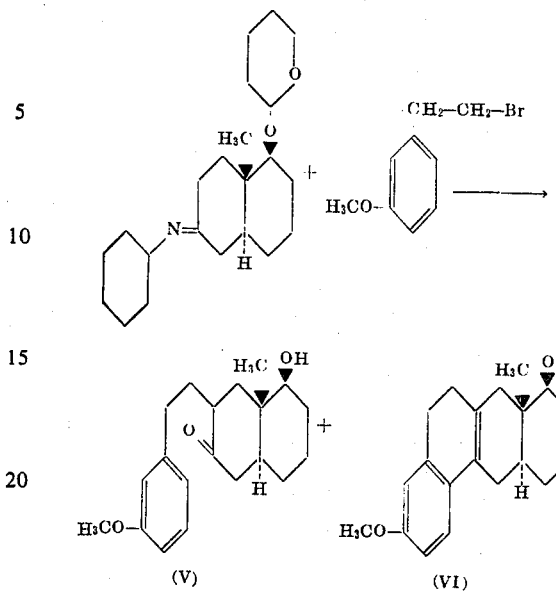

(V)     (VI)

The novel compound of this invention is an anti-androgen in that it opposes the action of testosterone or other androgens in the mammalian body. As an anti-androgen, the compound of this invention is useful in the treatment of certain physiological conditions in mammals characterized by high androgen blood level, such as prostatic hypertrophy, hirsutism and the like.

Having described the basic concepts of the invention, reference is now made to the following examples which are provided by way of illustration, but not of limitation, of the practice of the invention.

EXAMPLE 1

Preparation of pyranyl ether of 5β-hydroxy-10β-methyl-trans-2-decalone

A solution of 5β-hydroxy-10β-methyl-trans-2-decalone [Boyce and Whitehurst, *J. Chem. Soc.*, 2680, (1960)] (18.00 g., 0.09980) in dihydropyran (50 ml., redistilled from sodium) containing two drops of hydrochloric acid was allowed to stand overnight at room temperature. The mixture was neutralized by addition of sodium bicarbonate (1 g.), filtered, and concentrated in vacuo. The residual crystalline solid was purified by elution from a column of Norit-A and silica gel with petroleum ether, and crystallization from the same solvent, affording 25.04 g. of the product (III). Yield, 95 percent; m.p. 77°–87°(capill.).

Anal. Calcd. for $C_{16}H_{26}O_3$: C, 72.14; H, 9.84. Found: C, 71.96; H, 9.90.

EXAMPLE 2

Preparation of 5, 6, 7, 7aβ,8, 9, 10, 11, 11aα, 12-decahydro-8β-hydroxy-3-methoxy-7a-methylbenz <a> anthracene A solution of the pyranyl ether (III) prepared in Example 1 (27.34 g., 0.1026 mole) and cyclohexylamine (10.68 g., 0.1078 mole) in dry benzene (250 ml.) was refluxed under nitrogen using a Dean and Stark trap to collect the water. After 2.5 hr., water evolution had ceased. The benzene and unchanged cyclohexylamine were evaporated in vacuo, and the residual oil was redissolved in dry tetrahydrofuran (70 ml.). To this solution was slowly added 45.1 ml. (0.1105 mole) of a 2.45 molar solution of ethylmagnesium bromide in tetrahydrofuran. A further 20 ml. of dry tetrahydrofuran was added to the reaction mixture to maintain the homogeneity. After gas evolution had ceased, tetrahydrofruan (50 ml.) followed by m-methoxyphenethyl bromide (23.18 g., 0.1078 mole) in tetrahydrofuran (60 ml.) were added slowly to the reaction mixture. After refluxing overnight, 200 ml. of 10 percent hydrochloric acid was added and reflux was continued for 2 hr. The solvent was removed in vacuo, and the residual liquors were extracted with benzene. The combined benzene extracts were washed with 10 percent hydrochloric acid, aqueous sodium bicarbonate and then dried over magnesium sulfate. After passing through a pad of florisil, the solvent was evaporated. T.l.c. of the residual oil (31.4 g.) indicated the presence of unchanged starting materials and both (V) and (I). This crude residue was dissolved in methanol (550 ml.) containing concentrated aqueous hydrochloric acid (125 ml.), and the solution was refluxed for 6 hr. Methanol was then evaporated in vacuo until a copious amount of white solid had separated from the solution. The slurry was refrigerated overnight before filtration. The solid was dissolved in benzene, and the solution dried over magnesium sulfate. Evaporation of the solvent and crystallization of the residual oil (14 g.) from an ether-petroleum ether mixture afforded 6 g. (20 percent) of (I) as a white crystalline solid, mp 127°–132°(capill). Recrystallization from an acetone-cyclohexane mixture raised the melting point to 134°–136°(capill); $\nu_{max}^{CCl_4}$ 3630 (OH), 2840 (OMe), 1650, 1610 and 1500 (C = C—Ar) cm$^{-1}$; $\lambda_{max}^{MeOH}$ 271(15,700). The n.m.r. spectrum showed singlets (3H) at 47.5 (C—CH$_3$) and 228 (OCH$_3$) cps, an unresolved multiplet (1H) from 190 to 215 (CH—OH) cps and a multiplet (3H) from 395 to 440 (Ar—H) cps.

Anal. Calc. for $C_{20}H_{26}O_2$: C, 80,49; H, 8.74. Found: C, 80.35; H, 8.83.

The structure of compound (I) was confirmed as:

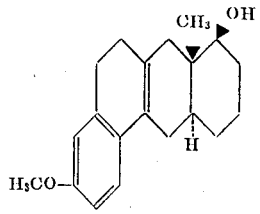

EXAMPLE 3

Determination of Anti-Androgenic Activity

In determining the anti-androgenic activity of the compound of this invention, three groups of 21-day old male rats are castrated and treated for seven days. The first control group is injected once daily with 0.1 ml. of the vehicle to be used with the test compound, and the second control group receives a daily dose of 0.1 or 0.2 mg. of testosterone for the seven-day test period.

The third group receive a daily injection of the compound under test at varying dosages, and a daily injection of 0.1 or 0.2 mg. of testosterone.

One day following the last injection, the rats are killed and autopsied, and the weights of the seminal vesicles, ventral prostate, levator ani and preputial glands are recorded. The anti-androgenic activity is determined by calculating the degree of inhibition of testosterone induced hypertrophy of the aforementioned sex accessories.

5, 6, 7, 7a$\beta$, 8, 9, 10, 11, 11a$\alpha$, 12-decahydro-8$\beta$-hydroxy-3-methoxy-7a-methylbenz <a> anthracene is tested using the above procedure. The mean percent inhibitions for five test animals are shown in the following table:

| Seminal vesicles % Inhibition | Ventral prostate | Levator ani | Preputial glands |
|---|---|---|---|
| 47% | 50% | 35% | 49% |

It will be apparent that various changes and modifications can be made in the details of procedure and use without departing from the spirit of the invention, especially as defined in the following claim.

I claim:

1. A compound of the formula:

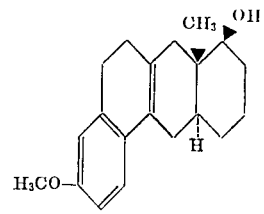

* * * * *